Feb. 22, 1927.
J. D. NEULS
1,618,775
FUMIGATING APPARATUS
Filed March 22, 1924
3 Sheets-Sheet 1
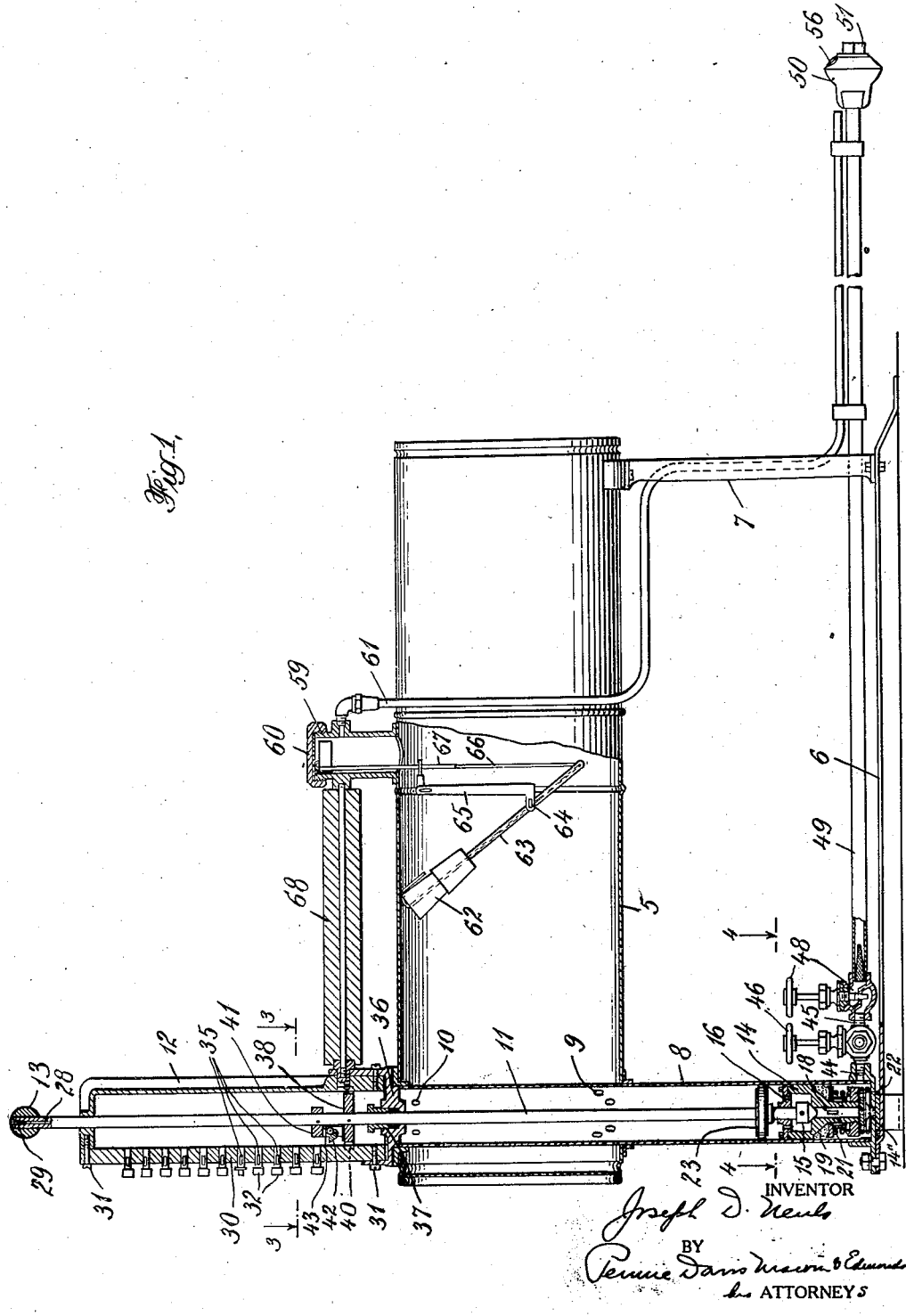

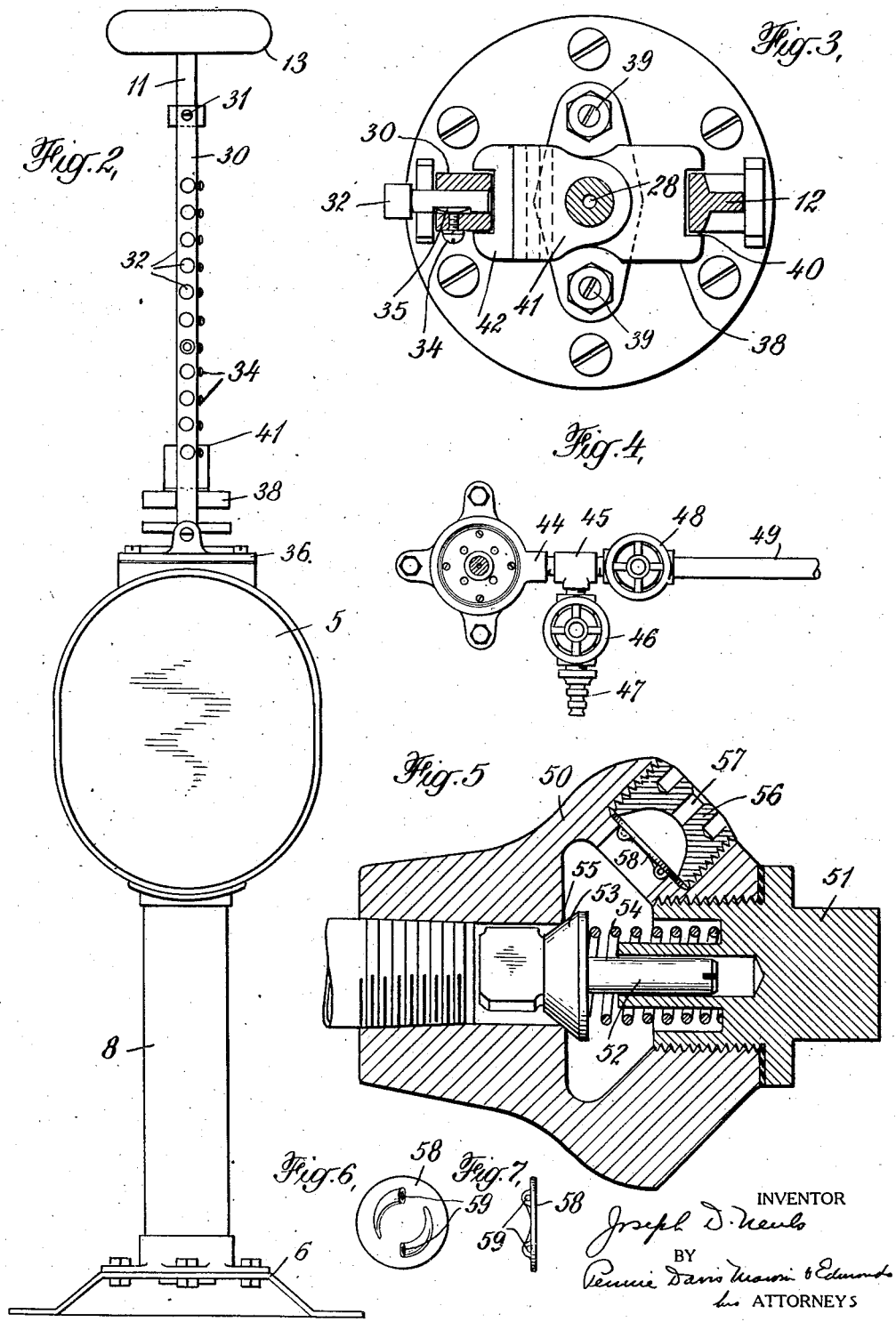

Feb. 22, 1927.
J. D. NEULS
1,618,775
FUMIGATING APPARATUS
Filed March 22, 1924   3 Sheets-Sheet 3
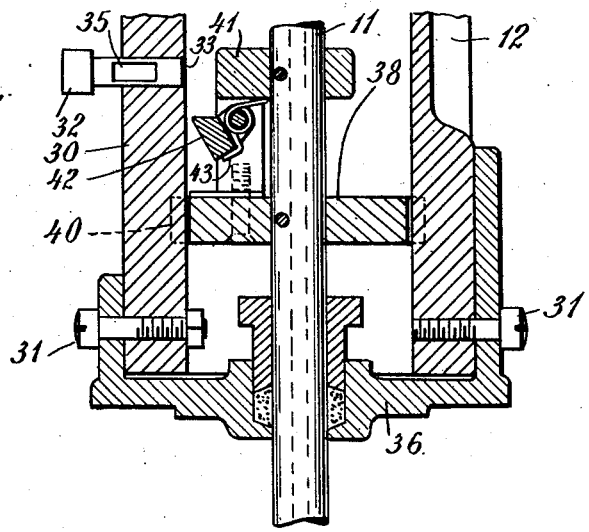
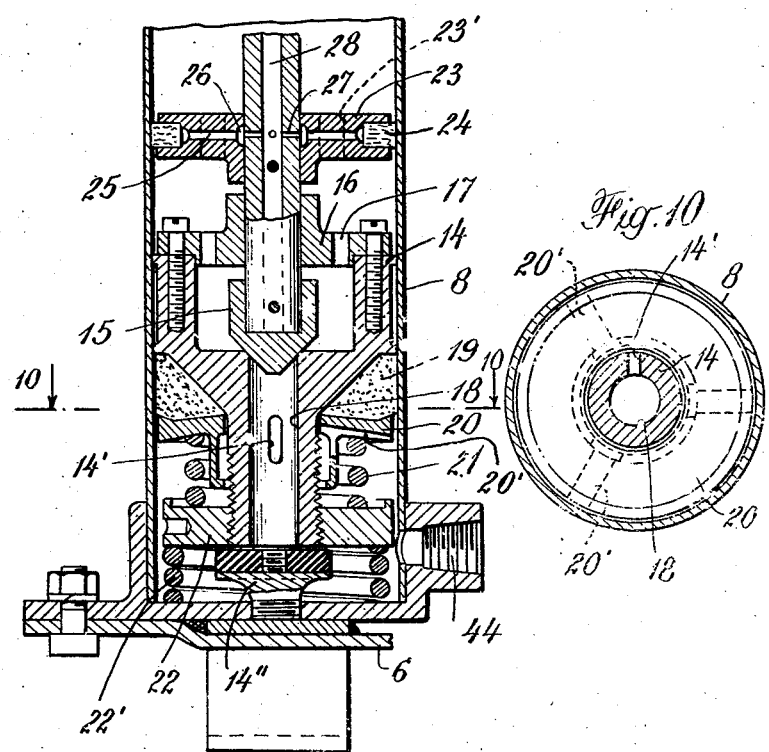
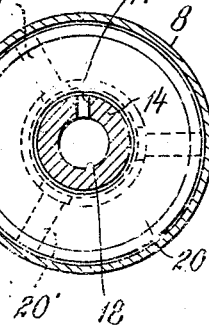

Patented Feb. 22, 1927.

1,618,775

UNITED STATES PATENT OFFICE.

JOSEPH D. NEULS, OF LOS ANGELES, CALIFORNIA, ASSIGNOR TO CALIFORNIA CYANIDE COMPANY, INC., OF NEW YORK, N. Y., A CORPORATION OF DELAWARE.

FUMIGATING APPARATUS.

Application filed March 22, 1924. Serial No. 701,038.

This invention relates to apparatus for distributing lethal gases for the purpose of destroying insects and other vermin, and particularly to an apparatus which facilitates the vaporization of a liquid agent for the purpose mentioned.

Although the apparatus is not limited to a particular application, it is primarily intended to be used in the treatment of trees and other vegetation. In fumigation of this kind it is usual to cover the tree, for example, with a suitable tent and to introduce the lethal agent beneath the tent. As the trees vary in size it is necessary that the dosage be varied in each instance, and consequently the amount of the lethal agent to be employed must be accurately measured. Liquid hydrocyanic acid is the preferred agent and has been utilized heretofore either as a vapor produced externally of the tent or as a liquid which is atomized and thus caused to form a vapor within the tent. Hydrocyanic acid is an extremely dangerous material as the breathing of almost imperceptible amounts thereof is sometimes fatal. It is essential, therefore, that the handling of liquid hydrocyanic acid and similar lethal agents be carefully safeguarded.

It is the object of the present invention to provide an apparatus of the atomizing type which will permit the delivery of accurately measured doses of liquid hydrocyanic acid and other fumigating agents as a finely divided spray which vaporizes almost instantaneously within the enclosure to be treated.

Another object of the invention is the provision in an apparatus of the kind described of suitable safety devices whereby leakage after generation and other avoidable contact with the hydrocyanic acid or its vapor is prevented.

Further objects and advantages of the invention will be apparent as it is better understood by reference to the following specification and the accompanying drawing, in which Fig. 1 is a vertical section through an apparatus embodying the invention;

Fig. 2 is an end elevation thereof;

Fig. 3 is an enlarged section on the line 3—3 of Fig. 1;

Fig. 4 is a section on the line 4—4 of Fig. 1;

Fig. 5 is a longitudinal section through the atomizing nozzle of the apparatus;

Figs. 6 and 7 are detail views in front and end elevation of the atomizer disk;

Fig. 8 is an enlarged sectional view of the selective mechanism;

Fig. 9 is an enlarged sectional view of the piston and cylinder; and

Fig. 10 is a detail plan view of the packing spring collar.

Referring to the drawing, 5 indicates a suitable closed tank or receptacle for the liquid hydrocyanic acid which is supported on a base 6 by an upright support 7 and a pump cylinder 8. The pump cylinder extends through the tank and is secured thereto by suitable liquid-tight connections. It is provided with openings 9 and 10 which permit liquid from the tank to flow freely into the cylinder. The upper openings 10 allow the escape of air or vapor from the cylinder into the tank.

A plunger rod 11 is supported in the pump cylinder and guided at its upper end by a bracket 12 through which it passes, and a handle 13 secured to the upper end of the plunger rod may be grasped by the operator in reciprocating the rod. At its lower end the plunger rod 11 is loosely connected to a piston 14 so that the rod is permitted to move relatively thereto. Connection is afforded by a valve 15 which is secured to the lower end of the plunger rod and which operates in a space between the piston 14 and a cap 16 which is secured to the piston. The cap is provided with openings 17 so that the liquid will flow therethrough and the valve 15 seats in the end of a passage 18 which extends through the piston 14. To prevent the escape of liquid about the piston a packing 19 is disposed about a tapered portion of the piston and is held under compression by a ring 20 and a spring 21 bearing upon a collar 22 which is threadedly secured to the lower end of the piston.

The piston 14 is slotted at 14′ and the ring 20 is drilled at 20′ so that the passage 18 is always in communication with the space above the collar 22. Any air which enters the lower part of the cylinder through the connections leading therefrom enters this space and escapes therefrom when the valve 15 is lifted from its seat. Air pockets are avoided by this arrangement and the operation of the apparatus is improved.

The plunger rod is guided near its lower end by a collar 23 having openings 23' therein to permit the passage of liquid. The collar is grooved at its periphery to receive a ring 24 of felt or other suitable material. Passages 25 are drilled through the collar to a groove 26 which is connected by passages 27 to an axial passage 28 in the plunger rod. The passage 28 extends to the top of the rod and is closed by a screw 20. When the latter is withdrawn the passage can be filled with lubricating oil which will be fed automatically to the ring 24, thus effecting lubrication of the cylinder at each operation of the plunger. This arrangement avoids the necessity of dismantling the apparatus to apply lubricant to the pump.

The measuring of the liquid is accomplished by means of an interchangeable rack 30 which is secured by screws 31 to the bracket 12. Racks having a different unitary measuring arrangement can be substituted readily for the rack illustrated in the drawing, and it is a part of the invention to provide a plurality of racks for use with each apparatus so that the apparatus can be employed most effectively in view of existing conditions. A plurality of pins 32 are slidably mounted in openings 33 provided therefor in the rack and are limited as to their longitudinal movement by set screws 34 which engage springs in grooves 35 formed in the pins. The pins may be moved inwardly by the operator to indicate the quantity of liquid which is to be withdrawn from the tank upon the operation of the plunger rod.

At the top of the pump cylinder 8 the plunger rod 11 passes through a cylinder head 36 having a stuffing box 37 to prevent the escape of liquid or vapor about the rod. A collar 38 is secured to the rod above the cylinder head and is provided with a tongue 40 which travels in the cooperating groove in the rack 30 so that all of the parts are always in the desired alinement. A collar 41 is secured to the plunger rod above the collar 38 and pivotally supports a cam 42. A spring 43 permits the cam to turn on its pivot and to pass any one of the stop pins 32 which may be disposed in its path upon the upward movement of the plunger rod. The rod can thus be drawn upwardly until the collar 38 contacts with one of the stop pins. Upon the return movement of the plunger rod the cam 42 engages the projecting stop pin and forces it back into its normal position, thus resetting the apparatus.

Return movement of the plunger is limited by engagement of the piston 14 with a stop 14″ which is threadedly secured in the bottom of the cylinder. This stop is adjusted when the apparatus is calibrated and is then preferably sweated in so that no further adjustment can be made. The capacity of the cylinder is thus fixed for each of the adjustable stop pins. Preferably a spring 22' is disposed about the stop 14″ to lift the piston slightly when pressure on the plunger rod is released. This relieves the pressure on the liquid or creates a slight suction and prevents after-generation.

When one of the stop pins has been projected into the path of the collar 38 and as the plunger rod is lifted, the valve 15 rises first from its seat at the end of the passage 18, thus opening the passage and permitting the liquid which fills the pump cylinder to flow downwardly to the opposite side of the piston 14. Further upward movement of the plunger rod lifts the piston through the liquid until the collar 38 engages the selected stop pin and the desired amount of liquid has been passed to the lower side of the piston. Upon the downward movement of the plunger rod the valve 15 first seats, thus preventing return of the liquid and the continued movement of the plunger rod forces the liquid from the pump cylinder.

The liquid passes through an outlet 44 through a T 45 having a valve 46 supported thereon in communication with a hose connection 47. The purpose of this arrangement is to permit withdrawal of the liquid remaining in the tank and pump when the work has been completed. A needle valve 48 is secured to the T 45 and a pipe 49 communicates therewith and extends to the nozzle 50. The purpose of the needle valve is to permit closure of the apparatus when the pipe 49 and the nozzle 50 require inspection.

The nozzle 50 which is secured to the end of the pipe 49 is closed by a plug 51 which supports the stem 52 of a check valve 53, the latter being held by a spring 54 against a seat 55. The check valve remains closed except when the plunger rod is actuated to force liquid from the apparatus. The pressure of the liquid causes the valve to open and to permit escape of the liquid until the pressure is relieved. Being disposed at the outlet end of the apparatus the check valve effectively prevents leakage and after generation which is particularly dangerous when volatile liquids such as hydrocyanic acid are used for fumigation. The nozzle has an outlet 56 with an opening 57 therein, the outlet being threadedly mounted in the nozzle and preferably an atomizer disc 58 is arranged behind the outlet to assist in breaking up the liquid into a fine spray which will vaporize almost instantaneously when it is discharged to the atmosphere. The disc 58 may have openings 59 therein of suitable form to cause the liquid to whirl or be divided otherwise into a spray which escapes through the opening 57 in the nozzle outlet. One or more nozzle outlets may be employed as desired.

The tank 5 is provided with a filling opening 59 having a cap 60 which is removable to permit the introduction of liquid. A pipe 61 is connected to the filling opening 59 and extends to a point adjacent the nozzle so that any vapor present in the atmosphere of the tank will escape therefrom at a point adjacent the discharge end of the apparatus. This pipe permits air to enter the tank as the liquid is withdrawn therefrom. To indicate the amount of liquid in the tank a float 62 is supported therein upon a lever 63 which is pivotally mounted at 64 on a bracket 65. A rod 66 is connected to the end of the lever and extends through a tubular guide 67 in the filling opening 59. When the cap 60 is in place the float is held in its uppermost position but when the cap is removed the float takes the level of the liquid and the upper end of the rod 66 indicates this level to the operator. When the tank is being filled the rod is depressed and the operator can thus readily observe the filling and avoid spilling the dangerous liquid.

The apparatus herein described is intended to be portable and is provided, therefore, with a handle 68 which permits the operator to lift and carry it. In apparatus of larger size the handle can be omitted and the entire structure might be mounted on a wheeled support, although for the purpose of a portable apparatus the base 6, which is preferably constructed of pressed steel, is sufficient.

In using the apparatus the operator removes the cap 60 and fills the tank with liquid from the portable safety carrier which is provided for that purpose. This portable safety carrier (not shown) may be mounted for convenience on a cradle of any suitable kind so that the pouring of the liquid is facilitated. When the tank is filled the cap is replaced and the fumigating operation may commence. The operator places the nozzle beneath the tent or other enclosure which has been placed previously about the tree or vegetation to be treated. A helper estimates the quantity of the fumigating agent which is to be used, and in accordance with this estimate the proper stop pin is moved inwardly to ensure the withdrawal of the correct amount of liquid from the tank. The operator then lifts the plunger rod to the limit of its upward travel and depresses it to force the measured quantity of liquid through the spray nozzle into the enclosure. The liquid enters the enclosure as a fine spray and is immediately vaporized and circulates through the enclosure to serve its purpose in killing the living organisms which infest the tree.

The apparatus as described is simple in structure, includes no parts which become disarranged easily and requires practically no attention to maintain it in operative condition. As above indicated the pump cylinder can be oiled from the exterior thereof to the passage in the plunger rod, and the other parts of the apparatus are so designed that the operator need not come in contact with the deadly liquid. If reasonable precautions are taken the apparatus can be used with absolute safety.

Various changes may be made in the form and arrangement of the parts without departing from the invention or sacrificing any of the advantages thereof.

I claim:—

1. In a fumigating apparatus the combination of a container, a cylinder communicating therewith, a piston in the cylinder, a pipe communicating with the cylinder below the piston, means including a plurality of stops spaced to indicate units of capacity of the cylinder and adapted to be projected selectively to limit the movement of the piston in one direction and means to return automatically the projected stop to its normal position when the piston is moved in the opposite direction.

2. In a fumigating apparatus the combination of a container, a cylinder communicating therewith, a piston in the cylinder, a pipe communicating with the cylinder below the piston, means including a plurality of stops spaced to indicate units of capacity of the cylinder and adapted to be projected selectively to limit the movement of the piston in one direction and means associated with the piston to return the projected stop to its normal position when the piston is moved in the opposite direction including a pivoted cam adapted to pass the stop in one direction and to force it outwardly upon the return movement.

3. In a fumigating apparatus the combination of a container, a cylinder communicating therewith, a piston in the cylinder having a passage therethrough, a plunger loosely connected to the piston and having a valve at its end adapted to close said passage when the plunger moves in one direction and to open it when the movement of the plunger is reversed, a pipe communicating with the cylinder below the piston, and means including a plurality of stops spaced to indicate units of capacity of the cylinder and adapted to be selectively projected into the path of the plunger to limit the movement thereof when said passage is open, said means being detachable to permit the substitution of one in which the stops are spaced to indicate different units.

4. In a fumigating apparatus the combination of a container, a cylinder communicating therewith, a piston in the cylinder having a passage therethrough, a plunger loosely connected to the piston and having a valve at its end adapted to close said passage when the plunger moves in one direction and to open it when the movement of the plunger is reversed, a pipe communicating with the cylinder below the piston, means including a plurality of stops spaced to indicate units of capacity of the cylinder and adapted to be selectively projected into the path of the plunger to limit the movement thereof when said passage is open, and means carried by the plunger to return the projected stop to its normal position when the latter is moved to eject liquid from the cylinder.

5. In a fumigating apparatus the combination of a container, a cylinder communicating therewith, a piston in the cylinder having a passage therethrough, a plunger loosely connected to the piston and having a valve at its end adapted to close said passage when the plunger moves in one direction and to open it when the movement of the plunger is reversed, a pipe communicating with the cylinder below the piston, means including a plurality of stops spaced to indicate units of capacity of the cylinder and adapted to be selectively projected into the path of the plunger to limit the movement thereof when said passage is open, and means carried by the plunger to return the projected stop to its normal position when the latter is moved to eject liquid from the cylinder, including a pivoted cam which passes the stop when the plunger moves in one direction and forces it outwardly upon the return movement.

6. In a fumigating apparatus the combination of a container, a cylinder communicating therewith, a piston in the cylinder having a passage therethrough, a plunger loosely connected to the piston and having a valve at its end adapted to close said passage when the plunger moves in one direction and to open it when the movement of the plunger is reversed, and a pipe communicating with the cylinder below the piston, said piston having a vent to permit the escape of air from the pipe and the end of the cylinder with which it communicates.

7. In a fumigating apparatus the combination of a container, a cylinder communicating therewith, a piston in the cylinder having a passage therethrough, a plunger loosely connected to the piston and having a valve at its end adapted to close said passage when the plunger moves in one direction and to open it when the movement of the plunger is reversed, a pipe communicating with the cylinder below the piston, having an outlet which prevents the escape of fluid except under the pressure of the piston, said piston having a vent to permit the escape of air from the pipe and the end of the cylinder with which it communicates.

In testimony whereof I affix my signature.

JOSEPH D. NEULS.